United States Patent

Bienert et al.

[11] Patent Number: 6,146,261
[45] Date of Patent: Nov. 14, 2000

[54] METHOD AND APPARATUS FOR PRODUCING AND FILLING A TUBULAR PACKAGING CASING

[75] Inventors: Olaf Bienert, Waldems; Fritz Räke, Hargesheim; Ortwin Ruschitschka, Büttelborn, all of Germany

[73] Assignee: Poly-Clip System GmbH & Co. KG, Frankfurt am Main, Germany

[21] Appl. No.: 09/167,159

[22] Filed: Oct. 6, 1998

[30] Foreign Application Priority Data

Oct. 6, 1997 [DE] Germany .............. 197 43 977

[51] Int. Cl.⁷ .................................................. A22C 11/02
[52] U.S. Cl. ................................................. 452/32; 452/22
[58] Field of Search .......................... 452/21.22, 24, 452/37, 35, 32

[56] References Cited

U.S. PATENT DOCUMENTS

| | | | |
|---|---|---|---|
| 4,563,792 | 1/1986 | Niedecker | 452/32 |
| 4,570,301 | 2/1986 | Beckman et al. | 452/35 |
| 4,577,370 | 3/1986 | Kollross | 452/35 |
| 4,640,083 | 2/1987 | Takanashi et al. | 452/35 |
| 4,734,956 | 4/1988 | Frey et al. | 452/35 |
| 5,600,308 | 2/1997 | Corpeny et al. | 452/32 |

*Primary Examiner*—Willis Little
*Attorney, Agent, or Firm*—Norris, McLaughlin & Marcus, P.A.

[57] ABSTRACT

Method and apparatus for producing and filling a tubular packaging casing, wherein the production rate of the casing is adjusted in dependence on the withdrawal rate of the casing from a buffer reservoir.

8 Claims, 1 Drawing Sheet

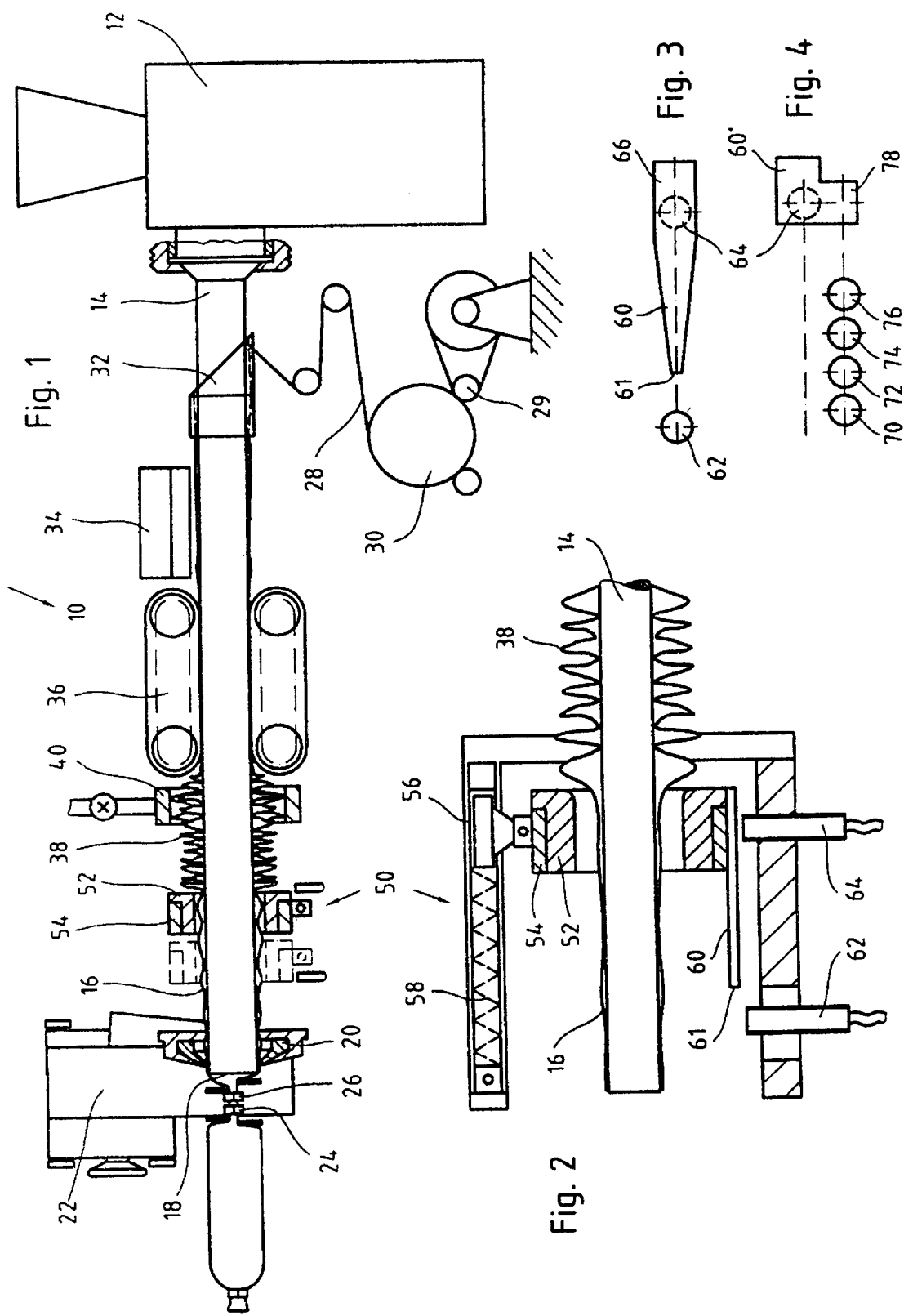

METHOD AND APPARATUS FOR PRODUCING AND FILLING A TUBULAR PACKAGING CASING

This invention relates to a method of producing and filling a tubular packaging casing, where a buffer reservoir of tubular packaging casing is produced by connecting two longitudinal edges of a film sheet, and the tubular packaging casing thus obtained is withdrawn from the reservoir for filling purposes. The invention also relates to an apparatus for producing a tubular packaging casing to be filled, comprising a drive for feeding the packaging casing, and a movable element whose position depends on the size of a reservoir of tubular packaging casing produced already.

It is known to put the open end of a tubular packaging casing produced already and sealed at one end over the filling tube of a filling machine and draw the same onto the filling tube such that there is a reservoir of tubular packaging casing on the filling tube. The tubular casing is filled in that filling is pressed through the filling tube into the packaging casing sealed at one end, while casing material is at the same time withdrawn from the reservoir. This prior art involves the disadvantage that there is only a limited reservoir of packaging casing drawn onto the filling tube.

To eliminate this disadvantage, the tubular packaging casing can be made from a simple film sheet during the filling operation. This is described for instance in EP-B-0, 105,558. According to this document, film sheet is withdrawn from a very large supply roller, and by means of a forming shoulder disposed around the filling tube is first of all formed into an open tube, where the longitudinal edges of the film sheet are lying on of each other. Subsequently, the longitudinal edges of the film sheet lying on each other are permanently connected with each other by means of welding, so that a tube is obtained which constitutes the tubular packaging casing to be filled. The production of the tubular packaging casing is effected in a continuous process and leads to a buffer reservoir of tubular packaging casing, from which the tubular packaging casing can be withdrawn for filling purposes.

Filling the packaging casing and producing the same may be effected simultaneously. The speed with which the tubular packaging casing is produced and moved into the buffer reservoir is always larger than the speed with which the tubular packaging casing is withdrawn on the other side of the buffer reservoir during the filling operation. The buffer reservoir is nothing else than the tubular packaging casing upset to form a caterpillar. When the reservoir becomes too large, the production of tubular packaging casing is stopped; but when the reservoir becomes too small, the production of the packaging casing is resumed. In particular when producing long tubular packages, where a maximum of tube reservoir is produced, it happens that compressing the packaging casing to form a caterpiller leads to bends in the packaging casing, which for instance in the case of a composite aluminum foil may lead to points of break.

The German Disclosure Letter DE 195 01 982 describes a feeding device of a machine discontinuously processing strip-shaped material, but no apparatus and accordingly no method for producing and filling a tubular packaging casing. In the machine known from DE 195 91 982 A1 the material is supplied from a bobbin, whose rotational speed is controlled by a control circuit. The supply of material to the point where it is processed is effected by means of a dancing roller and a subsequent feed roller, which is activated by the demand of a subsequently connected processing machine. Sensors are continuously measuring the length of material supplied to the dancing roller and the feed of material. From these parameters, the position of the dancing roller is calculated on the basis of the geometrical extension of the web of material. A further sensor determines the real position of the dancing roller. As an input variable of the control circuit there is used the difference between the measured and the calculated position of the dancing roller. The regulation and control provided in accordance with DE 195 01 982 A1 is relatively complex, and merely because of the fact that it depends on detecting the position of a dancing roller, it cannot be transferred to a method or an apparatus for producing and filling tubular packaging casings. The aforementioned problems underlying this invention are neither discussed nor solved in the DE-OS 195 01 982 A1.

It is therefore the object underlying the invention to eliminate the above disadvantages and create a system which operates more safely and more economically than the known one.

In accordance with the invention, this object is solved by a method as described above, where the production speed of the packaging casing is adjusted in dependence on the withdrawal speed with which the tubular packaging casing is withdrawn from the buffer reservoir. By means of such a method it is avoided on the one hand that the production of the packaging casing is permanently switched off and on again, so that much less load is applied onto the corresponding apparatus. On the other hand, such method provides for keeping the size of the reservoir small and within narrow limits, so that the packaging casing is not overloaded by an excessive upsetting in the buffer reservoir.

In a preferred embodiment of the method a difference between the withdrawal speed and the production speed is determined by means of the size of the buffer reservoir. This method variant is based on the knowledge that the buffer reservoir is increasing when the production speed is larger than the withdrawal speed, and is decreasing when the production speed is smaller than the withdrawal speed. As an alternative to this method variant, the withdrawal speed might for instance also be determined by means of a measuring roller, which rolls over the tubular casing when the same is withdrawn, and thus rotates with a speed corresponding to the withdrawal speed. The speed signal thus obtained might then be evaluated for controlling the production speed. However, a wrong adaptation of the production speed to the withdrawal speed, for instance because of a systematic measurement error when determining the withdrawal speed, could not be found in this way, with the result that the production speed would actually constantly be larger or even smaller than the withdrawal speed. The first case would lead to a production failure, as during the production and filling of the packaging casing a larger and larger buffer reservoir would accumulate. When the production speed is too low, there is, however, the risk that the packaging casing might burst upon filling, because during the filling operation not enough packaging casing material can be withdrawn. These problems are efficiently eliminated by means of the preferred method variant.

In accordance with a preferred aspect of the method, the production speed is adjusted inversely proportional to the size of the buffer reservoir to a speed value from a continuous range of values, which also includes every possible withdrawal speed. By means of the proportional adaptation of the production speed to the size of the buffer reservoir, a very precise and sensitive control of the production speed can be achieved.

As an alternative to the last-mentioned method variant, the production speed can also be adjusted to the size of the reservoir in steps such that the speed is adjusted the higher the smaller the buffer reservoir, and vice versa. Such method, where the production speed is changed in steps, can particularly easily be realized by means of simple switches without proportional transfer elements.

In a method where the longitudinal edges of the film sheet are connected by means of welding, the welding energy is also preferably adjusted corresponding to the production speed in dependence on the size of the buffer reservoir. In such a method, both the production speed and the welding energy are directly dependent on the size of the buffer reservoir and thus indirectly on the size of the withdrawal speed. It is thus avoided that in the case of a small production speed, the packaging casing is excessively heated as a result of too high a welding energy, or vice versa in the case of a high production speed and a correspondingly too low welding energy, the packaging casing is not welded at all or incorrectly.

In accordance with the invention, the solution of the object also consists in an apparatus as described above, which is characterized in that the drive is provided with a speed control. The advantage of such an apparatus is quite obvious: the drive for feeding the packaging casing determines the production speed; when the same can be controlled, it can be adapted to the withdrawal speed, so that the method in accordance with the invention can be performed with such an apparatus.

In a preferred embodiment of the apparatus the same has at least one sensor connected with the speed control, and where on the movable element a wedge-shaped damping lug is mounted, which by moving the element can be moved across the sensor. By means of such an apparatus, a value proportional to the size of the buffer reservoir can be determined, which during the execution of the inventive method can be evaluated for controlling the production speed.

A likewise preferred alternative apparatus is characterized in that it includes a plurality of stationary proximity switches which are arranged in series in direction of movement of the element and are connected with the speed control, and that on the movable element a damping lug is mounted, which by moving the element can be moved along the proximity switches. By means of such an apparatus, the size of the reservoir can be determined not continuously, but in steps. However, this is enough to correspondingly adapt the production speed in steps to the withdrawal speed. The apparatus can in particular be realized more easily than the above-described embodiment, but does not provide for just a precise control of the production speed as the latter.

The method and the apparatus will now be explained in detail with reference to two embodiments, and also with reference to the drawing, wherein:

FIG. 1 shows a side view of an apparatus for producing and filling tubular packaging casings;

FIG. 2 shows an enlarged segment of FIG. 1 with an arrangement for determining the size of the buffer reservoir;

FIG. 3 shows a detail of the arrangement in accordance with FIG. 2, namely a wedge-shaped damping lug and a sensor; and FIG. 4 shows in detail a sensor arrangement as an alternative to the one shown in FIG. 3.

The apparatus 10 for producing and filling tubular packaging casings in accordance with FIG. 1 comprises a filling machine 12, from which filling is pressed through a filling tube 14 into a packaging casing 16 sealed at one end.

The tubular packaging casing 16 to be filled has been drawn onto the outer surface of the filling tube 14 and—as it is sealed at its one end disposed before the orifice 18 of the filling tube 14—is continuously withdrawn from the outer surface of the filling tube during the filling operation. A casing brake 20 acts against this withdrawal of the packaging casing 16. The force required for withdrawing the packaging casing 16 and to be applied via the filling pressure is therefore increased with the result that the filling pressure is correspondingly high and leads to a taut package with the desired internal pressure. When a package has been filled sufficiently, it is sealed at its second end with two closure clips 24 and 26 by means of a sealing machine 22. Then, the packaging casing is cut through between the two closure clips, so that in turn a sealed end of a packaging casing section that has not yet been filled is located before the orifice 18 of the filling tube and can be filled as described above. It is noted that when filling a package, the packaging casing 16 is withdrawn from the outer surface of the filling tube 14 with a more or less constant speed, but at least when sealing the package ends, this withdrawal speed greatly varies and sometimes goes back to zero.

For continuously withdrawing packaging casing material from the outer surface of the filling tube 14 as described above, the apparatus 10 has a means for withdrawing a film sheet 28 from a film roller 30 provided with a separate drive 29, and for forming the same to a tube that is open at first by means of a forming shoulder 32 disposed around the filling tube 14, where the longitudinal edges of the film sheet are lying on each other. Subsequently, the longitudinal edges of the film sheet 28 lying on each other are permanently connected with each other by means of a welding means 34, so that a tube is formed around the outer surface of the filling tube 14, which tube constitutes the tubular packaging casing to be filled. The packaging casing tube thus produced is then continuously moved on by a drive 36 used for feeding purposes, so that the tube piles up behind the feed drive 36 and is upset to form a caterpillar, which represents a buffer reservoir 38 from which the packaging casing 16 is then withdrawn for filling purposes. In this way, the packaging casing 16 can at the same time be produced and be filled in another section. Newly produced packaging casing 16 is supplied to the buffer reservoir from the one side (the right side in the drawing), while at the same time the packaging casing is withdrawn from the buffer reservoir 38 on the other side (the left side in the drawing).

It is clear that the buffer reservoir 38 becomes larger when the feed rate with which the newly produced packaging casing 16 is moved forward by the feed drive 36 is larger than the speed with which the packaging casing 16 is withdrawn from the buffer reservoir 38 during the filling operation. On the other hand, the buffer reservoir 38 becomes smaller when the feed rate of the drive 36, which at the same time is the production speed for the packaging casing 16, is smaller than the withdrawal speed when filling the packaging casing 16.

Since the size of the buffer reservoir 38 increases or decreases depending on the difference between withdrawal speed and production speed, a signal can be derived from the size of the buffer reservoir 38 with which a speed control for the drive 36 is-influenced such that the speed of the drive 36 decreases with increasing buffer reservoir 38 and increases with decreasing buffer reservoir 38. In this way, the production speed can be controlled such that it corresponds to the withdrawal speed in accordance with the control accuracy.

Only for the sake of completeness should it be mentioned that the newly welded packaging casing 16 is wetted by a cooling means 40 with a cooling and/or friction-reducing medium. The cooling means 40 is arranged such that it cools the packaging casing 16 when it is delivered into the buffer reservoir 38 by the feed drive 36.

The determination of the size of the buffer reservoir is effected by a measuring device 50, which is illustrated both in FIG. 1 and in FIG. 2—in FIG. 2 in an enlarged segment. The measuring device 50 has a stop 52, whose inside diameter is larger than that of the filling tube 14 together with the stretched packaging casing 16 lying on the same, but is smaller than the outside diameter of the buffer reservoir 38, i.e. the outside diameter of the upset packaging casing 16. The stop 52 is held in a holder 54, which in turn is movably supported in a guideway 56 in longitudinal direction of the filling tube 14 against the restoring force of a spring 58. The stop 52 is fixed at the holder 54 such that it can easily be replaced by other stops, so as to be able to adapt the stop 52 to filling tubes of different outside diameters.

At the holder 54 there is also fixed a damping lug 60. It can thus be moved in longitudinal direction of the filling tube together with the holder 54 and the stop 52. The damping lug 60 extends parallel to the path of movement and is wedge-shaped in a top view (FIG. 3), i.e. its width increases to a maximum value proceeding from a narrow front end 61.

An analog sensor 62 mounted at the measuring device is arranged such-that at least in partial areas of the path of movement of the wedge-shaped damping lug 60 it is damped by the same, so that due to the wedge shape of the damping lug it provides an analog measurement value, from which the relative position of the damping lug—which corresponds to the actual path of movement of the stop 52—can clearly be determined. In addition, the measuring device 50 has a proximity switch 64, which is arranged such that it is active when the stop 52 is located in a first partial area of movement of the entire path of movement.

As long as the measuring device 50 is uninfluenced by the buffer reservoir 38, the stop 52 together with the holder 54 and the damping lug 60 is retained in the starting position shown in FIG. 2 by means of the return spring 58, in which starting position the damping lug 60 trips the proximity switch 64. When during the production of the tubular packaging casing 16 the buffer reservoir 38, which consists of the packaging casing 16 upset to form the caterpillar, is formed and grows, the front end of the buffer reservoir 38—from which the packaging casing is withdrawn during the filling operation—reaches the stop 52 from a certain size of the buffer reservoir onwards. With increasing buffer reservoir 38, the buffer reservoir 38 moves the stop 52 forward against the restoring force of the spring 58. As long as the stop 52 moves in its first partial area of movement, the proximity switch 64 is active. When the stop 52 is moved on by the buffer reservoir 38, it leaves the first partial area of movement with the result that the proximity switch 64 becomes inactive.

During the movement of the stop 52 through the buffer reservoir 38, the narrow front end 61 of the wedge-shaped damping lug 60 gets into the detection zone of the analog sensor 62, which is thus slightly damped and provides a corresponding measurement signal. When the stop 52 is moved on with increasing buffer reservoir 38, the volume of the wedge-shaped damping lug 60 located in the detection zone of the analog sensor 62 is increasing, so that the analog sensor 62 is increasingly damped with increasing movement of the stop 52 away from the buffer reservoir 38. With increasing damping of the analog sensor 62 the measurement signal provided by the same is changing, so that the respective measurement signal is a measure for the path of movement of the stop 52 and thus for the size of the buffer reservoir 38. By means of the size of the buffer reservoir thus determined, the feed rate and thus the production speed are directly controlled such that they correspond to the withdrawal speed.

The analog sensor 62 is mounted in an oblong hole aligned parallel to the longitudinal direction of the filling tube and thus parallel to the path of movement of the stop 52, and for adjusting the measuring device 50 can thus be fixed in various positions displaced parallel to the filling tube 14.

FIG. 3 shows the damping lug 60 as well as the analog sensor 62 and the proximity switch 64 in a top view. The damping lug 60 is disposed in its relative position with respect to the analog sensor 62 and the proximity switch 64, which position is defined by the starting position of the stop 52. When the stop 52 is moved out of this starting position, the position of the damping lug 60 changes in accordance with FIG. 3 such that the damping lug 60 moves to the left relative to the analog sensor 62 and the proximity switch 64. The front end 61 of the damping lug 60 more and more moves towards the analog sensor 62 and finally gets into its detection zone. As in the top view the width of the damping lug 60 is increasing more and more, proceeding from its front end 61, the surface of the damping lug 60 that has moved into the detection zone of the analog sensor 62 is increasing with increasing movement of the same to the left. Accordingly, the volume of the wedge-shaped damping lug 60 that has moved into the detection zone of the analog sensor 62 is also increasing, which leads to a greater damping of the analog sensor 62 and a corresponding measurement signal. The measurement signal is a voltage value which decreases with increasing damping of the analog sensor 62. The voltage value serves as a control signal for controlling the speed of the feed drive 36. As this control includes speed controllers for the feed drive 36, the measurement value provided by the analog sensor 62 also corresponds to a control variable for the speed controller of the feed drive 36.

FIG. 3 also reveals that the width of the damping lug 60 does no longer increase in a rear portion 66. The rear portion 66 covers the proximity switch 64 in the first partial area of movement of the stop 52 and thus trips said switch. Accordingly, the proximity switch 64 is constantly active in the first partial area of movement of the stop 52. Only when the damping lug 60 is moved out of the first partial area of movement and further to the left, as shown in FIG. 3, it releases the proximity switch 64, so that the same becomes inactive.

Having described the individual components of the system for producing and filling packaging casings shown in FIG. 1 with respect to their structure and their mode of operation, the mode of function of the entire system will now be described:

At the beginning of the operation, the feed drive 36, the welding means 34 and the film roller drive 29 are activated at the same time by means of a not represented switch, so that the production of the tubular packaging casing 16 is started, which on the filling tube 14 is moved in the direction of the casing brake 20 by means of the feed drive 36. Before the feed drive 36 the packaging casing 16 piles up to form a caterpillar and constitutes the buffer reservoir 38. With increasing buffer reservoir 38, the front end of the buffer reservoir 38 reaches the stop 52, which is moved on before the same with increasing buffer reservoir 38. The wedge-shaped damping lug 60 leaves its starting position together with the stop 52, and when leaving the first partial area of movement, when a certain buffer reservoir of tubular packaging casing 16 has already been produced, releases the inductive proximity switch 64. In response to the signal provided by the proximity switch 64, the tube-producing system, i.e. the feed drive 36, the welding means 34 and the film roller drive 29, is switched off. At the same time, the upstream filling machine 12 and the downstream sealing machine 22 are put into operation. Thus, the entire system is ready for production; it can be switched on by actuating a corresponding switch.

When the system is switched on, filling the packaging casing 16 is started on the one hand as described above, where at the same time packaging casing material is withdrawn from the buffer reservoir 38. The production of the tubular packaging casing 16 is also started in that the feed drive 36, the welding means 34 and the film roller drive 29 are switched on again. The packaging casing 16 produced is moved into the buffer reservoir 38, namely first with a speed which is slightly larger than the speed with which the packaging casing 16 is withdrawn from the buffer reservoir 38 during the filling operation. Thus, the buffer reservoir 38 is increasing first of all and—as has already been described—the stop 52 is moved to the left in accordance with the drawing. As soon as the front end 61 of the wedge-shaped damping lug 60 gets into the detection zone of the analog sensor 62, the signals provided by the analog sensor 62 correspond to a certain size of buffer reservoir due to the above described relations. The analog measurement signal is supplied to a not represented control means for the speed of the feed drive 36. In concrete terms, the analog sensor 62 produces a voltage which depends on the size of that surface of the wedge-shaped damping lug 60 which lies in the detection zone of the analog sensor 62. This voltage is supplied directly to a frequency converter, which is part of the control means. The voltage signal provided by the analog sensor 62 is converted by the frequency converter into a signal of a corresponding frequency. The frequency provided by the frequency converter defines a rotational speed for the feed drive 36, and the welding energy to be released by the welding means 34.

When the analog sensor 62 provides a measurement signal which corresponds to a size of buffer reservoir lying above a mean value, the speed of the feed drive 36 and thus the production speed are reduced accordingly. However, when the signal supplied by the analog sensor 62 to the control means indicates a size of buffer reservoir below a mean value, the production speed is increased. In the ideal case without deviation, the buffer reservoir 38 maintains its mean size, and the production speed precisely corresponds to the speed with which the packaging casing 16 is withdrawn from the buffer reservoir 38. As long as the front end 61 of the damping lug 60 has not yet reached the detection zone of the analog sensor 62, the feed drive 36 operates with maximum speed. But when the buffer reservoir 38 exceeds a certain size, at which the analog sensor 62 is damped beyond an adjustable maximum, the feed drive 36 is switched off. However, this does not happen in the case of a continuous production; rather, the above-described condition of a mean size of buffer reservoir is achieved, where the production speed corresponds to the withdrawal speed.

In the case of failures, for instance when the film tears off during the production of the tube, the buffer reservoir 38 is used up until the damping lug 60 again activates the proximity switch 64, whereupon the entire system is switched off.

FIG. 4 illustrates that instead of an analog sensor 62 there can also be used a plurality of proximity switches 70 to 76 disposed one behind the other in longitudinal direction of the filling tube for determining the size of the buffer reservoir. The proximity switches 70 to 76 are arranged such that they are first activated and then deactivated one after the other by a switching portion 78 of an alternative damping lug 60', when the damping lug 60' is moved forward with increasing buffer reservoir 38 together with the stop 62. When one of the proximity switches 70 to 76 has been activated, this corresponds to a certain size of buffer reservoir. The activation of two adjacent proximity switches also provides for the recognition of sizes of buffer reservoir lying in between. The proximity switches 70 to 76 are connected with the control for the feed drive 36, with which the feed rate is increased when the size of buffer reservoir lies below a mean value, and is decreased when the size of buffer reservoir lies above a mean value. Since the detection of the size of buffer reservoir is only effected in steps, the adaptation of the production speed is also effected in steps. The proximity switches together form a kind of multi-stage switch, where every switching stage corresponds to a certain feed rate. When the withdrawal speed corresponds to none of the stages for the production speed, the production speed is constantly switched to and fro between two values, one of which is larger than the withdrawal speed, and the other one is smaller. The switching portion 78 of the damping lug 60' constantly moves to and fro between two proximity switches for switching over the production speed.

What is claimed is:

1. A method of producing and filling a tubular packaging casing (16), where a buffer reservoir (38) of tubular packaging casing (16) is produced by connecting two longitudinal edges of a film sheet (30), and the tubular packaging casing (16) thus obtained is withdrawn from the buffer reservoir (38) during the filling operation, wherein the production speed of the packaging casing is adjusted in dependence on the withdrawal speed with which the tubular packaging casing (16) is withdrawn from the buffer reservoir (38).

2. The method as claimed in claim 1, wherein a difference between withdrawal speed and production speed is determined by means of the size of the buffer reservoir (38).

3. The method as claimed in claim 2, wherein the production speed is adjusted to a speed value from a continuous range of values inversely proportional to the size of the buffer reservoir, which range of values includes every possible withdrawal speed.

4. The method as claimed in claim 2, wherein the production speed is adapted in steps to the size of the buffer reservoir (38) such that the speed is adjusted the higher the smaller the buffer reservoir (38), and vice versa.

5. The method as claimed in claim 1, wherein the longitudinal edges of the film sheet (30) are connected by means of welding, wherein the welding energy is adjusted corresponding to the production speed in dependence on the size of the buffer reservoir.

6. An apparatus for producing a tubular packaging casing (16) to be filled, comprising a drive (36) for feeding the packaging casing, and a movable element (52) whose position depends on the size of a buffer reservoir (38) of tubular packaging casing (16) produced already, wherein the drive (36) is provided with a speed control.

7. The apparatus as claimed in claim 6,
wherein the apparatus has at least one stationary sensor (62) which is connected with the speed control, and that on the movable element (52) a wedge-shaped damping lug (60) is mounted, which by moving the element (52) can be moved across the sensor (62).

8. The apparatus as claimed in claim 6,
wherein the apparatus includes a plurality of stationary proximity switches (70, 72, 74, 76) arranged in series in direction of movement of the element (52) and connected with the speed control, and that on the movable element a damping lug (60') is mounted, which by moving the element can be moved along the proximity switches (70, 72, 74, 76).

* * * * *